US008367164B2

(12) United States Patent
Kim et al.

(10) Patent No.: US 8,367,164 B2
(45) Date of Patent: Feb. 5, 2013

(54) METHOD OF MANUFACTURING NANO-TEMPLATE FOR A HIGH-DENSITY PATTERNED MEDIUM AND HIGH-DENSITY MAGNETIC STORAGE MEDIUM USING THE SAME

(75) Inventors: Hae-sung Kim, Hwaseong-si (KR); Myung Bok Lee, Suwon-si (KR); Jin Seung Sohn, Seoul (KR)

(73) Assignee: Seagate Technology International, Grand Cayman (KY)

( * ) Notice: Subject to any disclaimer, the term of this patent is extended or adjusted under 35 U.S.C. 154(b) by 0 days.

(21) Appl. No.: 12/647,974

(22) Filed: Dec. 28, 2009

(65) Prior Publication Data

US 2010/0102028 A1    Apr. 29, 2010

Related U.S. Application Data

(62) Division of application No. 11/781,391, filed on Jul. 23, 2007, now Pat. No. 7,662,491.

(30) Foreign Application Priority Data

Sep. 1, 2006  (KR) .................. 10-2006-0084203

(51) Int. Cl.
*H01F 6/00* (2006.01)
*H01F 5/00* (2006.01)
(52) U.S. Cl. ......... 427/547; 427/598; 427/130; 427/128
(58) Field of Classification Search .................. 427/547, 427/598, 130
See application file for complete search history.

(56) References Cited

U.S. PATENT DOCUMENTS

| 4,001,463 | A  | * | 1/1977 | Schaefer et al. ............... 427/599 |
| 5,277,977 | A  | * | 1/1994 | Tokuoka et al. ............... 428/402 |
| 5,537,282 | A  | * | 7/1996 | Treves et al. ................... 360/135 |
| 6,636,371 | B1 | * | 10/2003 | Komatsu et al. ................ 360/16 |
| 7,041,394 | B2 |   | 5/2006 | Weller et al. |
| 7,189,438 | B2 |   | 3/2007 | Momose et al. |
| 2002/0136927 | A1 | * | 9/2002 | Hieda et al. ................. 428/694 T |
| 2003/0113503 | A1 | * | 6/2003 | Nakamura et al. ........... 428/64.3 |
| 2004/0229006 | A1 |   | 11/2004 | Momose et al. |
| 2005/0009260 | A1 | * | 1/2005 | Kim et al. ..................... 438/202 |
| 2005/0266271 | A1 |   | 12/2005 | Tsuchiya et al. |
| 2007/0224517 | A1 | * | 9/2007 | Yellen et al. ...................... 430/5 |
| 2008/0268288 | A1 | * | 10/2008 | Jin ................................ 428/800 |

FOREIGN PATENT DOCUMENTS

| JP | 2004110917 |   | 4/2004 |
| KR | 1020060086513 A |   | 8/2006 |
| WO | WO2005065303 | * | 7/2005 |

OTHER PUBLICATIONS

Wolfram MathWorld "Concentric Circles" <http://mathworld.wolfram.com/ConcentricCircles.html> accessed on Jun. 13, 2012.*
Notice of Allowance dated Oct. 9, 2009: U.S. Appl. No. 11/781,391.
Final Office Action dated Jul. 6, 2009: U.S. Appl. No. 11/781,391.
Non Final Office Action dated Feb. 19, 2009: U.S. Appl. No. 11/781,391.

* cited by examiner

*Primary Examiner* — Timothy Meeks
*Assistant Examiner* — Mandy Louie
(74) *Attorney, Agent, or Firm* — Ladas & Parry, LLP

(57) ABSTRACT

Disclosed is a method for manufacturing a template for a high-density patterned medium and a high-density magnetic storage medium using the same. In the method, magnetic particles are used as a mask and no lithographic process is required.

2 Claims, 7 Drawing Sheets

METHOD OF MANUFACTURING NANO-TEMPLATE FOR A HIGH-DENSITY PATTERNED MEDIUM AND HIGH-DENSITY MAGNETIC STORAGE MEDIUM USING THE SAME

CROSS-REFERENCE TO RELATED PATENT APPLICATIONS

This is a divisional application of U.S. Ser. No. 11/781,391 filed on Jul. 23, 2007 (now allowed), which claims priority from Korean patent application 10-2006-0084203, filed on Sep. 1, 2006, all of which are incorporated herein by reference.

BACKGROUND OF THE INVENTION

1. Field of the invention

The present invention relates to a method for manufacturing a nano-template which is suitable for fabricating a high-density patterned medium and a high-density magnetic storage medium using the same.

2. Description of the Related Art

There is an increased demand for a record medium which is capable of storing mass information including moving pictures and has a high portability. It is also demanded that users who carry the record medium have an ability to access to and use the stored information.

Portable memory devices may be largely classified into a solid-state memory device such as a flash memory and a disk-type memory device such as a hard disk. Since the solid-state memory device is expected to be developed to have a maximum capacity of several gigabytes (GBs) in the next several years, it is difficult to use the solid-state memory device as a large scale data storage device. On the other hand, even though the hard disk mounted on a portable device is expected to have a capacity of several tens of GBs in the near future, it is also anticipated to be difficult to achieve magnetic recording density of more than the several tens of GBs.

In order to overcome such limitations, a method for manufacturing a large-capacity high-density patterned medium has been proposed. E.g., U.S. Pat. No. 7,041,394. U.S. Pat. No. 7,041,394 reports a method which includes forming a locking pattern in a medium substrate and filling the locking pattern with a magnetic particle having a size of less than 0.1 micrometer (i.e., less than 100 nanometer). The locking pattern is formed by lithography. In manufacturing a large-capacity high-density patterned recording medium, a use of a pattern template makes it possible to simplify the manufacturing process of the recording medium and increase a recording density of the medium.

A conventional template, which is used to manufacture a high-density patterned medium, will now be described.

FIG. 1 is a picture of a conventional template, which is used to manufacture a high-density patterned medium, and FIG. 2 is a picture of high-density patterned medium manufactured by using the template shown in FIG. 1.

As shown in FIGS. 1 and 2, a high-density patterned medium can be manufactured by forming a pattern 10, which is etched in a substrate, and by filling the pattern 10 with a nanomaterial 20. The pattern 10 may be formed by lithography. The nanomaterial may be chemically synthesized particles and completely fills the pattern.

The capacity of high-density patterned medium manufactured by using a conventional template, for example one reported in U.S. Pat. No. 7,041,394, depends on the size of a formed pattern 10. That is, as the size of the pattern 10 gets smaller, a higher-density patterned storage medium can be manufactured.

However, it is very difficult, with the current lithography technology, to form a fine pattern with a width of less than tens of nanometers. Particularly, it is difficult to form a fine pattern of nanometer size over a broad region of a large capacity by means of the electron beam or photo-lithography technology. It takes a long period of time to uniformly form a fine pattern in a broad region of a medium substrate and productivity is degraded, so that there is a limitation to use the lithography technology for mass production of the pattern and/or recording medium.

SUMMARY OF THE INVENTION

The present invention provides a method for forming a nano-template for a high-density patterned medium, which enables mass production of a large-capacity high-density patterned medium, without using the lithography process for forming a fine pattern.

The present invention provides a high-density magnetic storage medium manufactured by using the method which does not employ the lithography process for forming a pattern.

In one embodiment of the present invention, there is provided a method for forming a template for a high-density patterned medium, the method includes: providing a substrate having a surface; applying a colloidal solution of magnetic particles to the surface of the substrate, the colloidal solution including a solvent and the magnetic particles; forming an uniform arrangement of the magnetic particles on the substrate by applying a magnetic field in a direction of perpendicular to the surface of the substrate; forming a magnetic particle layer on the substrate by removing the solvent from the surface of the substrate; etching the substrate by using nanoparticle layer as a mask; and removing the magnetic particles from the substrate.

The particles may be formed of one metal selected from the group consisting of Co, CoPt, CoP, CoPtCr, and an alloy thereof.

The magnetic field is applied by magnets positioned above and/or below the substrate. In one embodiment of the present invention, the magnet may be an electromagnet disk which has coils arranged concentrically thereon.

In one embodiment of the present invention, the substrate may be in the form of a disk and have radial tracks of protrusions.

In another embodiment of the present invention, the substrate may have a hard mask layer on its surface. In such case, the method further includes etching the hard mask layer before the substrate etching.

In accordance with another aspect of the present invention, there is provided a high-density magnetic storage medium including: a substrate having a surface; a perpendicular magnetic recording layer formed on the substrate; and a magnetic particle layer in which magnetic particles are arranged to form a pattern on the perpendicular magnetic recording layer.

In one embodiment, the perpendicular magnetic recording layer may be formed of a nanomaterial including CoCrPt.

In an embodiment of the present invention, the particle layer is formed of nanoparticles having an identical magnetic anisotropy which is perpendicular to the surface of the substrate. The nanoparticles may have an average diameter ranging several to several tens of nanometers and may have a cylindrical or cubic shape.

The nanoparticles may be formed of a metal selected from the group consisting of Co, CoPt, CoP, CoPtCr, and an alloy thereof. The nanoparticles are arranged into a pattern by application of a magnetic field. The magnetic field is applied in a direction of perpendicular to the surface of the substrate, on which the particles are placed.

In one embodiment of the present invention, a perpendicular magnetic recording layer may be formed on a surface of the substrate. The substrate and the perpendicular magnetic recording layer may be in the form of a disk and may have radial tracks of protrusions formed on the perpendicular magnetic recording layer. In the embodiment, the nanoparticles are located between the radial tracks of the protrusions. Therefore, the high-density magnetic storage medium has an alternating concentric circles of protrusions and concentric circles of magnetic particles.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
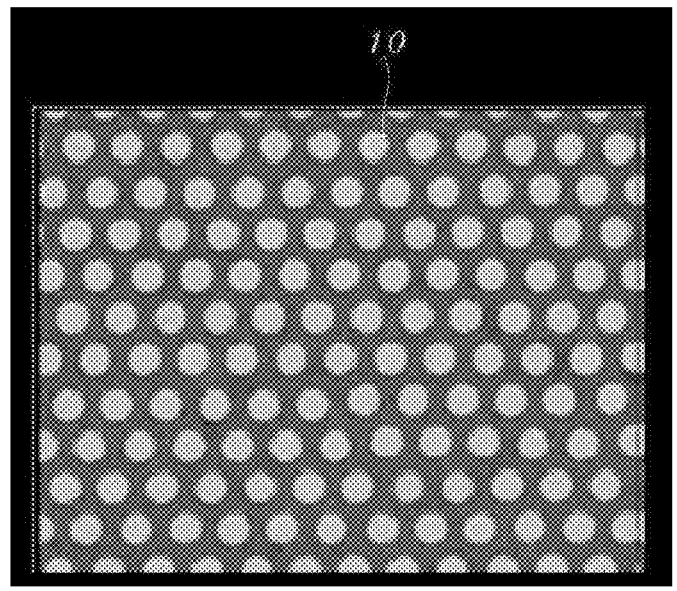
FIG. 1 is a picture of a conventional template for a high-density patterned medium, which is used to manufacture a high-density patterned medium.
Figure 2:
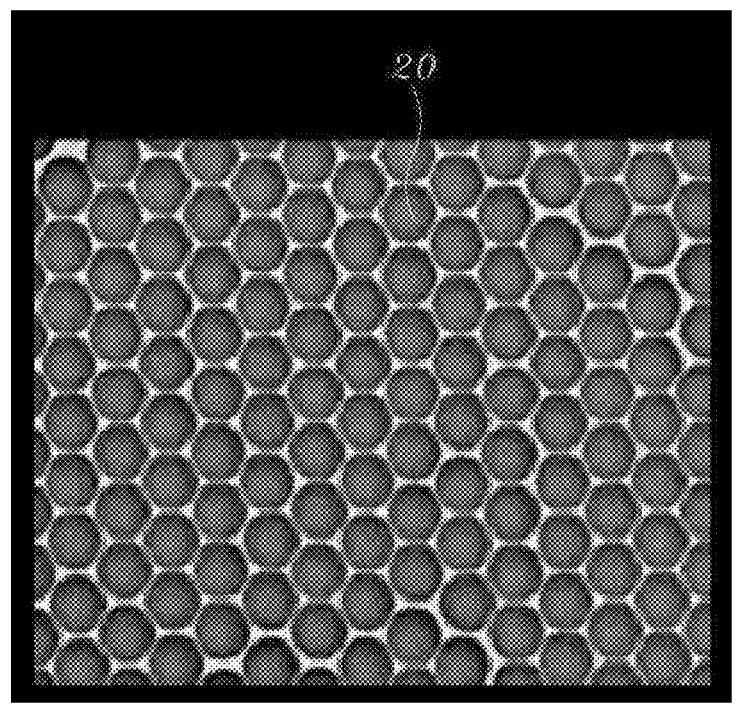
FIG. 2 is a picture of high-density patterned medium manufactured by using the template shown in FIG. 1.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
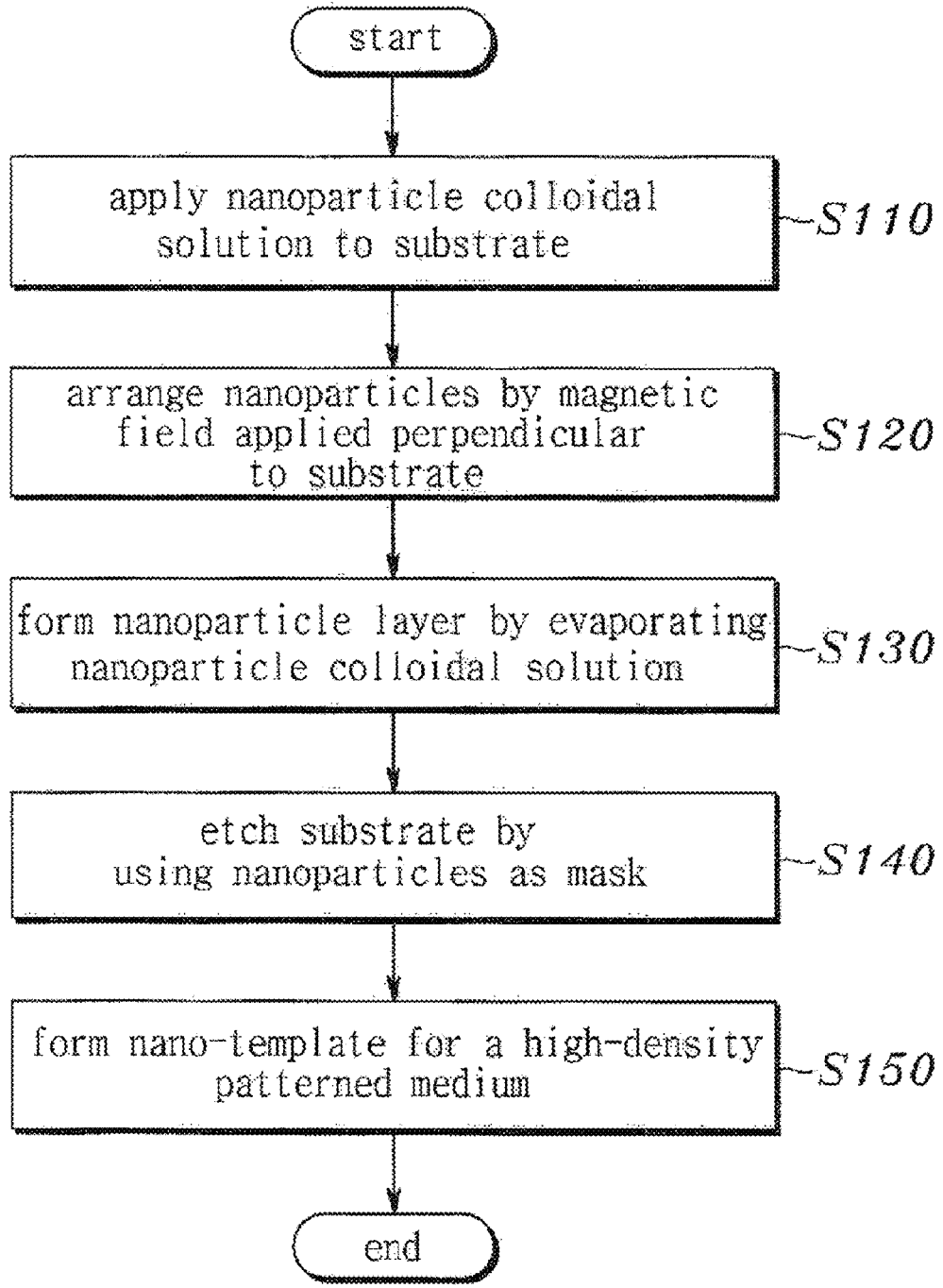
FIG. 3 is a flowchart illustrating a method of forming a nano-template for a high-density patterned medium according to an embodiment of the present invention.

FIG. 3 is a flowchart illustrating a method for forming a nano-template for a high-density patterned medium according to an embodiment of the present invention, and FIG. 4 to FIG. 11C are views illustrating each step shown in FIG. 3.

As shown in FIG. 3, according to the method for forming a nano-template for a high-density patterned medium, a colloidal solution including nanoparticles is applied to a substrate (step 110).

Figure 4:
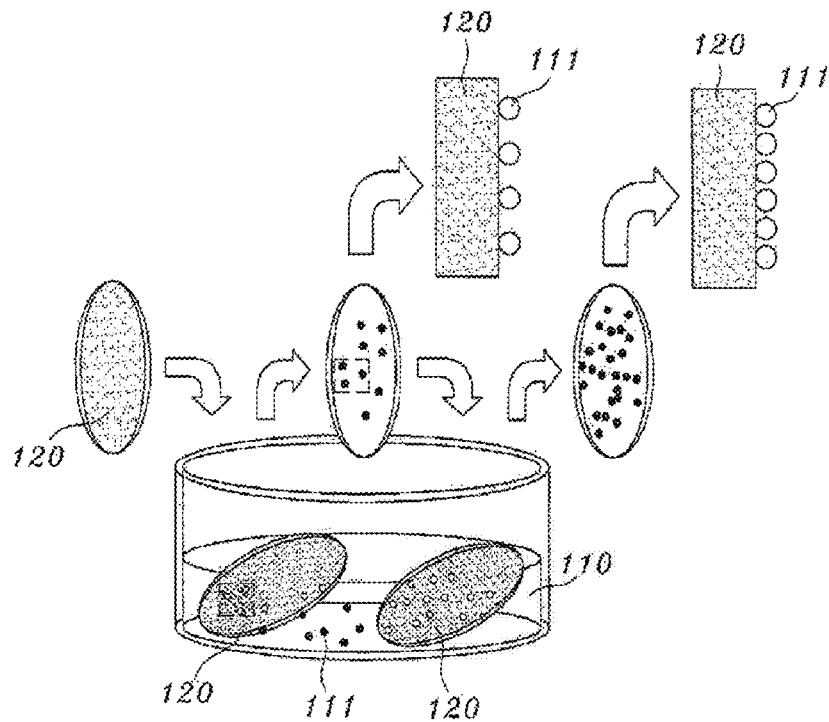
FIG. 4 is a view illustrating an exemplary step of applying a nanoparticle colloidal solution to a substrate according to an embodiment of the present invention.

FIG. 4 is a view illustrating a step of applying a nanoparticle colloidal solution to a substrate based on the method for forming the nano-template for a high-density patterned medium according to an embodiment of the present invention.

The nanoparticle colloidal solution 110 is applied to the substrate 120 by dipping method or a spin coating method. This method may be used after coating self-assembly monolayer(SAM). The application may be repeated several times until a desired density of nanoparticles on the surface of the substrate 120 is obtained.

The nanoparticle colloidal solution 110 may be formed by injecting or mixing nanoparticles 111 into or with a proper carrier. The proper carrier may include, but are not limited to, a colloidal solvent or a resist solution for lithography. The nanoparticles are formed from a metal material selected from the group consisting of, for example, Co, CoPt, CoP, CoPtCr, and an alloy thereof. In this case, it is possible to use nanoparticles 111 having sizes ranging from several to several tens of nanometers.

Figure 5:
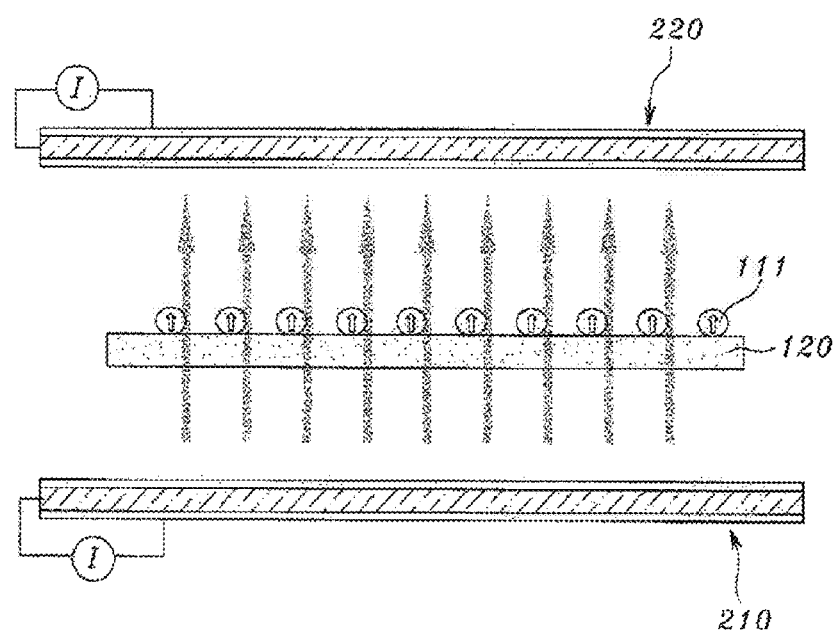
FIG. 5 is a schematic sectional view illustrating an arrangement of nanoparticles on a substrate by action of a pair of disk-shaped magnets, each positioned above and below the substrate.
Figure 6:
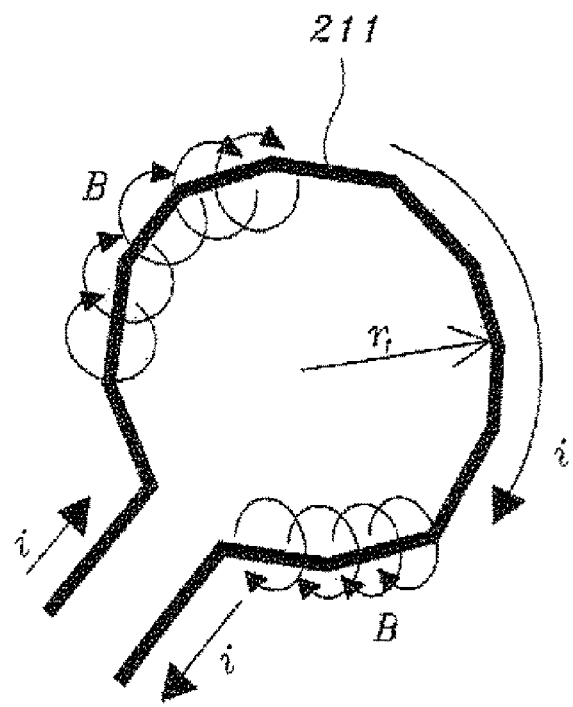
FIGS. 6 and 7 are views illustrating the structure of coils in the magnets shown in FIG. 5.
Figure 7:
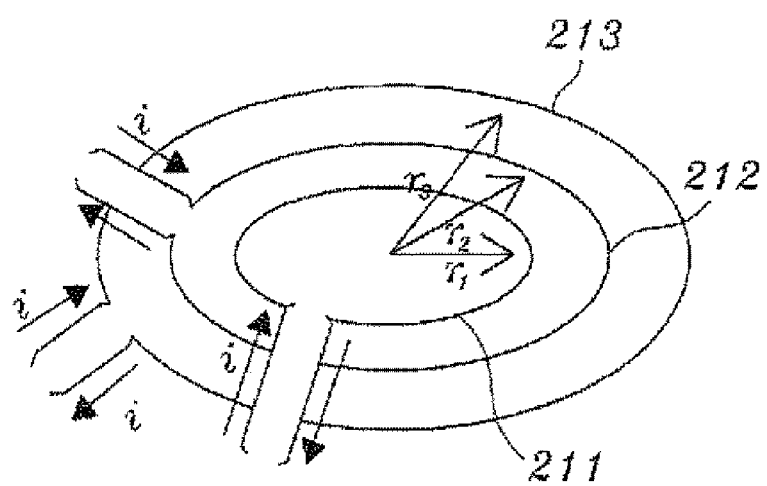
Figure 8:
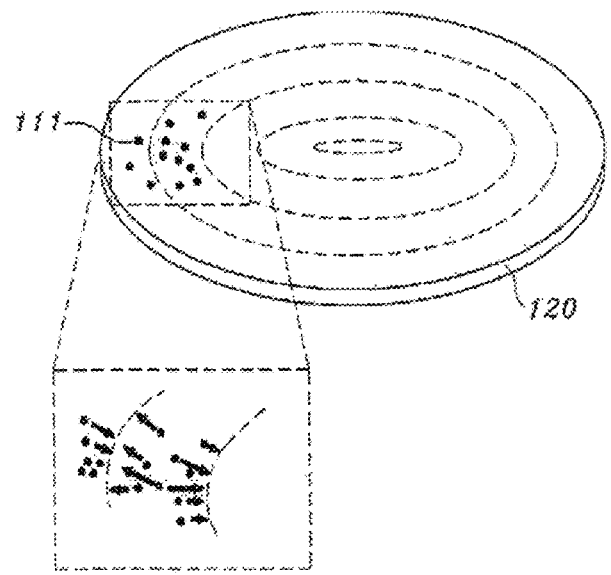
FIG. 8 is a view illustrating the movement and arrangement of nanoparticles on the substrate in FIG. 5, by the action of the pair of disk-shaped magnets.

FIG. 5 is a FIG. 5 is a schematic sectional view illustrating an arrangement of nanoparticles on a substrate by action of a pair of disk-shaped magnets, each positioned above and below the substrate. FIGS. 6 and 7 are views illustrating the structure of coils in the magnets shown in FIG. 5, and FIG. 8 is a view illustrating the movement and arrangement of nanoparticles on the substrate in FIG. 5, by the action of the pair of disk-shaped magnets.

As shown in FIGS. 5 to 8, the substrate 120, which has nanoparticles coated on its one surface, is inserted between the pair of disk-shaped magnets 210 and 220, which are arranged in parallel to each other to form a magnetic field in a transverse direction between the magnets 210 and 220, so that the magnetic field is applied to the nanoparticles in a direction perpendicular to the surface of the substrate 120 (step 120).

In on embodiment, as shown in FIGS. 6 and 7, the disk-shaped magnets 210 and 220 include electromagnets which have ring-shaped coils. The coils 211, 212, and 213 have different radiuses r1, r2 and r3, respectively, and each generate a magnetic field "B" when current "i" is applied to them. In one embodiment, the coils of one magnet 210 may be positioned in corresponding tracts to those of the coils of the other magnet 220. In other embodiment, the coils of one magnet 210 may be positioned to form alternating tracks with respect to the coils of the magnet 220.

In one embodiment, the substrate 120 is disposed horizontally between the pair of disk-shaped magnets 210 and 220 which form a magnetic field in the transverse (or vertical) direction between the disk-shaped magnets 210 and 220, and the nanoparticles 111 on the substrate 120 are arranged on the substrate 120 in a form of concentric circles or radial tracks which each correspond to the respective coils of the magnets 210 and 220.

FIG. 8 is a view illustrating an operation in which nanoparticles 111 on the substrate are arranged in a form of concentric circles by the pair of disk-shaped magnets 210 and 220. As indicated by arrows in an enlarged portion of FIG. 8, the nanoparticles 111 on the substrate 120 are moved to and are arranged along the electromagnetic tracks on the substrate 120, which each correspond to the coils 211, 212, and 213.

Figure 9:
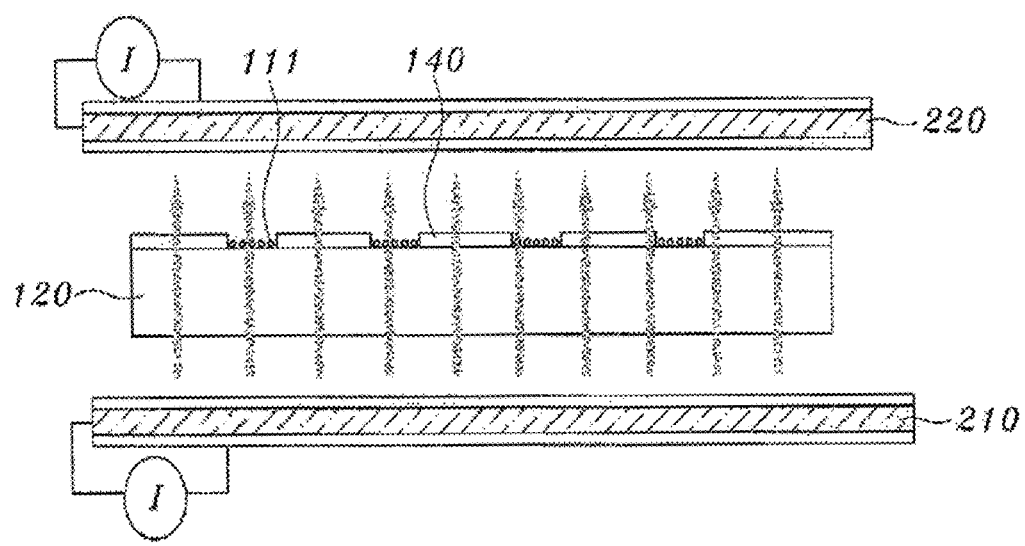
FIG. 9 is a schematic sectional view illustrating the structure of a substrate provided with radial tracks of protrusions, in which nanoparticles are located in the recessed track formed between the protrusions.

FIG. 9 is a is a schematic sectional view illustrating the structure of a substrate provided with radial tracks of protrusions, in which nanoparticles are located in the recessed track formed between the protrusions.

As shown in FIG. 9, the protrusions 140 may be formed as concentric circles or radial tracks on a surface of the substrate, and the nanoparticles 111 may be placed and arranged on the surface of the substrate 120 between the concentric circles of protrusions 140. The protrusions 140 may be formed before the nanoparticle colloidal solution is applied to the substrate 120. In one embodiment, the concentric circles or radial tracks of the protrusions 140 are formed on the surface of the substrate 120 in such a way that they each correspond to the positions of coils of the electromagnets of the pair of disk-shaped magnets, so that the nanoparticles 111 are arranged between the protrusions 140. The circles of protrusions may be formed by known methods, including lithography methods and may be made from various materials such as a polymer, an insulator, a metal, etc. The concentric circles or radial circles of protrusions improve the uniform arrangement of the magnetic particles on the substrate. Owing to a magnetic field applied in a direction of perpendicular to the substrate by the pair of disk-shaped magnets, the nanoparticles are arranged to have the identical magnetic anisotropy. The magnetic anisotropy includes a shape magnetic anisotropy and a crystal magnetic anisotropy. When the nanoparticles have a sphere shape or symmetrical shape, only the crystal magnetic anisotropy exerts an influence as a principal factor.

However, the nanoparticles, which are arranged to have the identical magnetic anisotropy by the magnetic field as described above, cannot be used as a high-density patterned medium as they are, because the nanoparticles lose the magnetic anisotropy when the pair of disk-shaped magnets is removed, causing the magnetic field applied to the substrate to disappear.

After the nanoparticles have been uniformly arranged on the substrate by the magnetic field as described above, the colloidal solution is removed to leave nanoparticles on the substrate, forming a nanoparticle layer pattern (step 130). This may be done by drying.

Figure 10A:
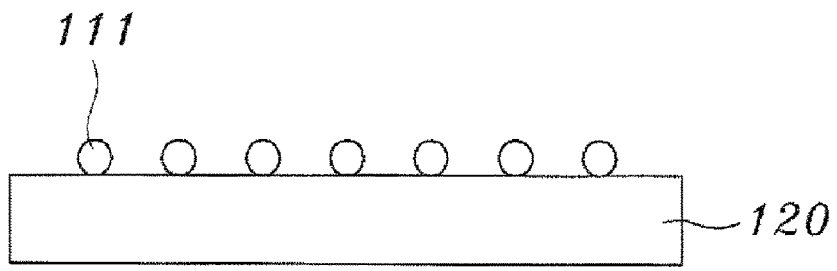
FIGS. 10A and 10B are cross-sectional views illustrating an exemplary substrate etching step.
Figure 10B:
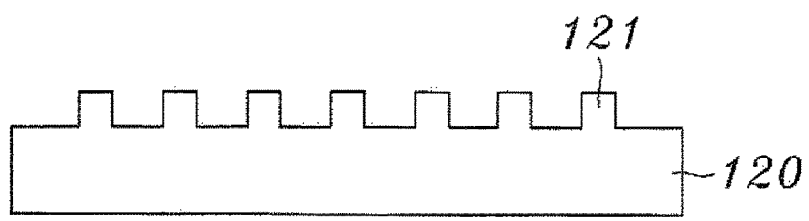

FIGS. 10A and 10B are cross-sectional views illustrating a substrate etching step based on the method for forming a nano-template for a high-density patterned medium according to an embodiment of the present invention.

As shown in FIGS. 10A and 10B, when the substrate 120 is etched by using the nanoparticles 111 as a mask (step 140), the pattern of the nanoparticle layer is transcribed on the substrate, so that a substrate nano-pattern 121 having the shape of nanoparticles is formed on the substrate 120. The etching may be performed by known methods, such as a plasma dry etching or plasma ion etching (RIE) scheme.

Then, the nanoparticles 111 used as a mask are removed from the substrate 120 to provide a nano-template (or a nano-master or nano-mold), having a nano-pattern 121 which corresponds to the arrangement of the nanoparticles (step 150).

By using the nano-template, which is produced as described above, it becomes possible to mass-produce a high-density patterned medium having a pattern of which width is tens of nanometers or less.

Figure 11A:
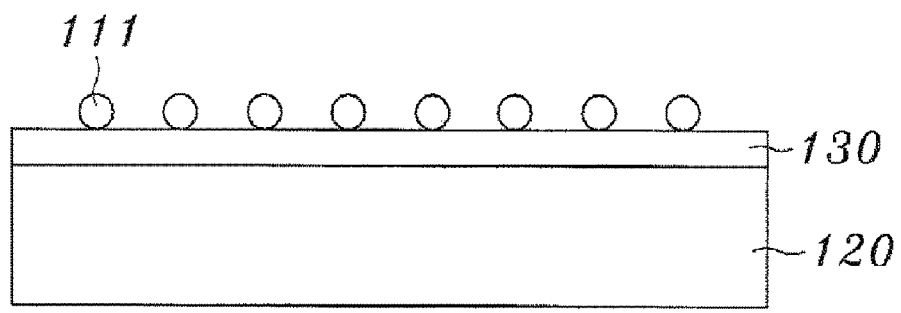
FIGS. 11A to 11C are cross-sectional views illustrating an exemplary substrate etching step which uses a hard mask layer.
Figure 11B:
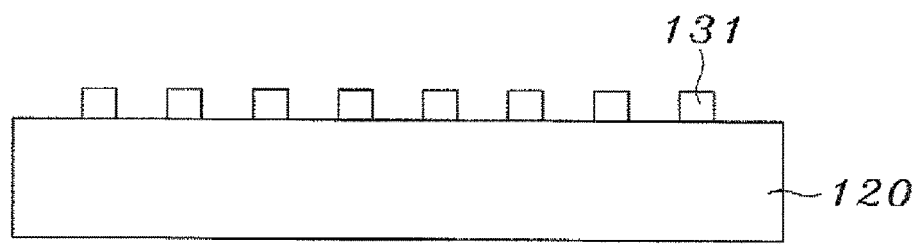
Figure 11C:
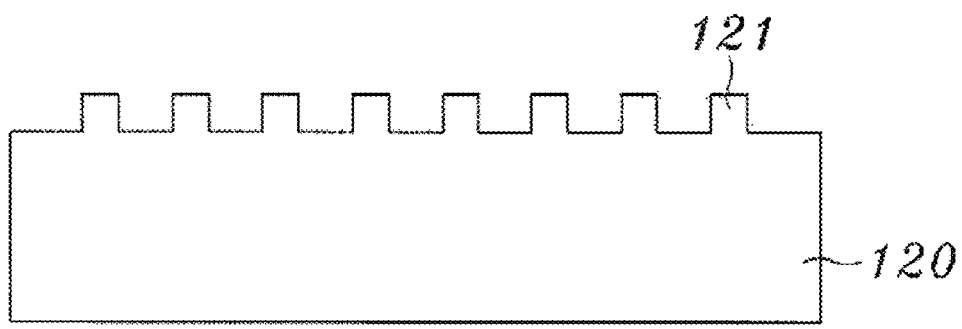

FIGS. 11A to 11C are cross-sectional views illustrating an exemplary substrate etching step using a hard mask layer, according to an embodiment of the present invention.

During a substrate etching process using the nanoparticles 111 as a mask, there may be difficulty in etching the substrate 120 by using the nanoparticles 111 as a mask, because of a too small size of nanoparticles or a poor etching selectivity with respect to the substrate. In this case, preferably, as shown in FIGS. 11A to 11C, a hard mask layer 130 (e.g., a silicon oxide layer or silicon nitride layer) having a material different from the metallic nanoparticles is formed on the surface of the substrate before the nanoparticle colloidal solution is applied to the surface of the substrate, and the hard mask layer 130 is etched by using the nanoparticles 111 as a mask to provide a hard mask pattern 131 on the substrate 120.

When the hard mask layer 130 is used as a layer for pattern transcription, as described above, the arranged pattern of the nanoparticles is transcribed on the hard mask layer 130, and the substrate 120 is etched by using a hard mask pattern 131. This provides an advantage in that the process is easy.

Then, when the substrate 120 is etched by using the hard mask pattern 131 as a mask, the same substrate nano-pattern 121 as that formed when the etching process is performed by using the nanoparticles 111 as a mask is formed on the substrate 120. In this case, the nanoparticles 111 and the hard disk pattern 131, which are used as an etching mask, may be easily removed by a known method.

The above-mentioned method for forming a nano-template may also be used to produce a high density magnetic storage medium. A method and structure of such a high density magnetic storage medium will be described below. In one embodiment, a magnetic field is applied in a direction of perpendicular to the substrate by a pair of disk-shaped magnets, each positioned below and above the substrate, respectively, so that nanoparticles on the substrate can be arranged to have the same magnetic anisotropy, and the arranged state of the nanoparticles can be continuously maintained.

Figure 12:
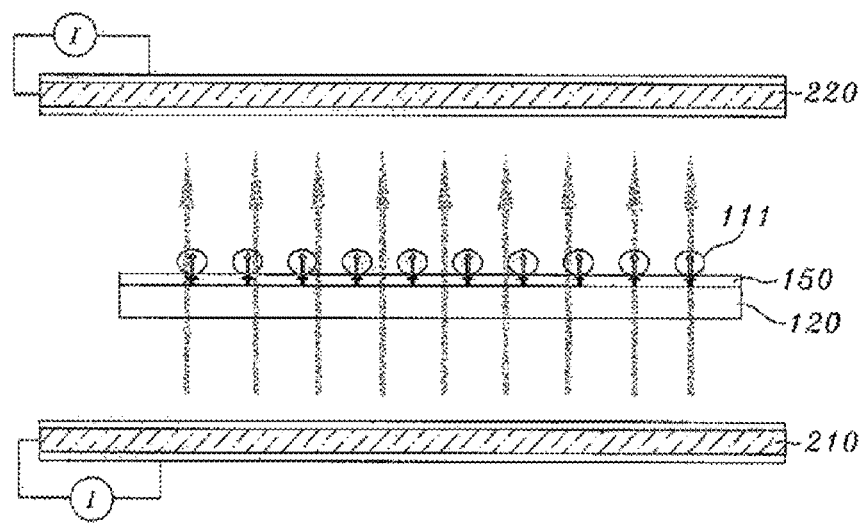
FIG. 12 is a cross-sectional view illustrating the structure of a high-density magnetic storage medium which includes a perpendicular magnetic recording layer and nanoparticles formed on the perpendicular magnetic recording layer, in which the perpendicular magnetic recording layer and the nanoparticles have same magnetic anisotropy.

FIG. 12 is a cross-sectional view illustrating the structure of a high-density magnetic storage medium which is arranged to have the same magnetic anisotropy by a magnetic field applied to a substrate according to an embodiment of the present invention.

As shown in FIG. 12, the high-density magnetic storage medium according to an embodiment of the present invention includes a substrate 120, a perpendicular magnetic recording layer 150, and a nanoparticle layer.

The substrate 120 serves as a supporter to form the high-density magnetic storage medium, and the perpendicular magnetic recording layer 150 is formed on the substrate 120. The perpendicular magnetic recording layer 150 may have a structure of a CoCrPt film deposited on the substrate 120, or a structure of a CoCrPt film formed on a film including Ru and Ta. The perpendicular magnetic recording layer 150 may be a single layer or laminate of multiple layers. The perpendicular magnetic recording layer has a thickness of tens of nanometers.

A nanoparticle colloidal solution is applied to the top of the perpendicular magnetic recording layer 150, which has been formed on the substrate 120 as described above. The nanoparticle colloidal solution 110 may be formed by injecting or mixing nanoparticles 111 into or with a proper carrier. The proper carrier may include, but are not limited to, a colloidal solvent or a resist solution for lithography. The nanoparticles are formed from a metal material selected from the group consisting of, for example, Co, CoPt, CoP, CoPtCr, and an alloy thereof. In this case, it is possible to use nanoparticles 111 having sizes ranging from several to several tens of nanometers. The nanoparticles have a symmetrical shape such as a cylindrical crystal structure or cubic crystal structure. They have a magnetic anisotropy perpendicular to the substrate 120.

Then, similarly to the above-mentioned method for forming a nano-template for a high-density patterned medium, a magnetic field is applied in a direction of perpendicular to the substrate 120 by a pair of disk-shaped magnets 210 and 220, which are positioned below and above the substrate, respectively, so that nanoparticles included in the nanoparticle colloidal solution are uniformly arranged to form a pattern, which corresponds to an electromagnetic force applied by coils of the magnets. In one embodiment, the pattern is plural concentric circles or radial tracks. Also, by the magnetic field applied perpendicularly to the substrate, both of the perpendicular magnetic recording layer 150 and the nanoparticles 111 are arranged to have the same magnetic anisotropy.

In one embodiment, the disk-shaped magnet is an electromagnet, in which a plurality of coils are arranged in a form of concentric circles, as shown in FIG. 7, so that nanoparticles on the substrate can be uniformly arranged on the substrate by current applied to the coils.

According to the high-density magnetic storage medium including the nanoparticle layer, which has been formed by the method based on the present invention, both of the perpendicular magnetic recording layer 150 and the nanoparticles 111 are arranged to have the same magnetic anisotropy, and the magnetic anisotropy of the nanoparticles is maintained by interaction between the perpendicular magnetic recording layer 150 and the nanoparticles 111 even after the magnetic field perpendicular to the substrate has been removed.

The nanoparticle layer may be fixed by evaporating the solvent of the colloidal solution. A passivation layer may be formed on the top of the nanoparticle layer. The passivation layer may be made from one selected from the group consisting of carbon, AlN, $Si_3N_4$, MgO, $Al_2O_3$, TiN, and TiC.

Therefore, the high-density magnetic storage medium according to the present invention, which can maintain the magnetic anisotropy as described above, includes a nanoparticle layer having a magnetic anisotropy perpendicular to the substrate. The nanoparticle layer formed of nanoparticles can be used as a storage unit with a size of several tens of nanometers or less, thereby being used as a large-capacity high-density magnetic storage medium.

In addition, when a substrate has protrusions as described with reference to FIG. 9, the protrusions may be arranged in a form of concentric circles or radial tracks and may be formed on a hard mask layer on the substrate. The protrusions, which may be arranged in a form of concentric circles at locations corresponding to those of the electromagnet of the disk-shaped magnet, enable the nanoparticles to be more uniformly arranged in a form of concentric circles on the substrate.

The nano-template forming method according to various embodiments of the present invention has the following effects.

According to the method for forming a nano-template for a high-density patterned medium, a pattern having a size of tens of nanometers or less can be easily formed on the nano-template by using nanoparticles arranged on the substrate without a lithography process, thereby achieving a high storage density for large capacity recording media.

A high-density magnetic storage medium with a nanoparticle layer, which maintains a magnetic anisotropy, may be fabricated, without using a lithography process, so that a large-capacity storage medium can be easily realized.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for forming a high-density magnetic storage medium, the method comprising:
   preparing a substrate having a surface;
   forming a perpendicular magnetic recording layer on the surface of the substrate;
   applying a colloidal solution of magnetic particles to the perpendicular magnetic recording layer, the colloidal solution comprising a solvent and the magnetic particles;
   arranging the magnetic particles concentrically on the perpendicular magnetic recording layer by applying a magnetic field perpendicular to the substrate; and
   forming a magnetic particle layer on the perpendicular magnetic recording layer by removing the solvent of the colloidal solution from the perpendicular magnetic recording layer,
   wherein the mangetic field perpendicular to the substrate is provided by magnets installed above and below the substrate and wherein each of the magnets comprises a coil which is arranged in a form of concentric circles.

2. The method as claimed in claim 1, wherein the substrate has protrusions which are arranged in a form of concentric circles.

* * * * *